United States Patent [19]
Fulton et al.

[11] Patent Number: 5,799,184
[45] Date of Patent: Aug. 25, 1998

[54] SYSTEM AND METHOD FOR IDENTIFYING DATA RECORDS USING SOLUTION BITMASKS

[75] Inventors: David L. Fulton, Sylvania; Eric R. Christensen, Bowling Green, both of Ohio

[73] Assignee: Microsoft Corporation, Redmond, Wash.

[21] Appl. No.: 108,841

[22] Filed: Aug. 17, 1993

Related U.S. Application Data

[63] Continuation of Ser. No. 32,729, Mar. 16, 1993, abandoned, which is a continuation of Ser. No. 593,089, Oct. 5, 1990, abandoned.

[51] Int. Cl.$^6$ ........................................................ G06F 12/30
[52] U.S. Cl. ............................................ 395/602; 395/600.3
[58] Field of Search .............................. 395/600, 425, 395/800, 602, 603; 364/419.19; 341/51, 67, 76, 87, 90

[56] References Cited

U.S. PATENT DOCUMENTS

| | | | |
|---|---|---|---|
| 3,456,243 | 7/1969 | Cass | 395/600 |
| 3,568,155 | 3/1971 | Abraham et al. | 395/600 |
| 3,643,226 | 2/1972 | Loizides et al. | 395/600 |
| 3,670,310 | 6/1972 | Bharwani et al. | 395/600 |
| 3,815,083 | 6/1974 | Dirks et al. | 395/600 |
| 3,916,387 | 10/1975 | Woodrum | 395/800 |
| 4,086,628 | 4/1978 | Woodrum | 395/600 |
| 4,117,470 | 9/1978 | Elliot | 345/25 |

(List continued on next page.)

FOREIGN PATENT DOCUMENTS

0375307 A2 6/1990 European Pat. Off. .
2196764 5/1988 United Kingdom .

OTHER PUBLICATIONS

D. D. Hamilton, Inside ADABAS, WH&O International (Wellesley, Massachusetts, Aug. 1991)

Dialog Record #03949365, file 120, Mar. 1996.

Dialog Record #07065605, file 120, Mar. 1996.

(List continued on next page.)

*Primary Examiner*—Paul R. Lintz
*Attorney, Agent, or Firm*—Seed and Berry LLP

[57] ABSTRACT

A system and method for information retrieval includes an input device, a storage device, an output device, and a data file stored in the storage device including n data records, and one or more index files having data corresponding to a key value comprising information derived from a data record, and the record number of the data record containing the data from which the key value is derived. The retrieval system further includes memory for storing a temporary solution bitmask n bits in length where each bit corresponds to a record in the data file and logic for accessing the data file ascertaining the record number for each data record corresponding to a key value which satisfies the search criteria, and logic for setting the bit corresponding to that record number in the temporary solution bitmask. The system also preferably includes logic for analyzing individual search criteria in a search query containing a plurality of search criteria to determine the extent to which the search is optimizable using the present invention, and logic for combining each of the temporary solution bitmasks ascertained for particular search criteria in a query to obtain a final solution bitmask representative of the set of all data records satisfying the query.

28 Claims, 5 Drawing Sheets

U.S. PATENT DOCUMENTS

| | | | |
|---|---|---|---|
| 4,118,788 | 10/1978 | Roberts | 395/600 |
| 4,221,003 | 9/1980 | Chang et al. | 395/600 |
| 4,255,796 | 3/1981 | Gabbe et al. | 395/600 |
| 4,318,184 | 3/1982 | Millett et al. | 395/600 |
| 4,319,225 | 3/1982 | Klose | 341/51 |
| 4,408,273 | 10/1983 | Plow | 395/600 |
| 4,468,728 | 8/1984 | Wang | 395/600 |
| 4,554,631 | 11/1985 | Reddington | 395/600 |
| 4,586,027 | 4/1986 | Tsukiyama | 341/95 |
| 4,606,002 | 8/1986 | Waisman | 345/600 |
| 4,626,829 | 12/1986 | Hauck | 341/63 |
| 4,677,550 | 6/1987 | Ferguson | 395/600 |
| 4,706,265 | 11/1987 | Furukawa | 375/122 |
| 4,713,754 | 12/1987 | Agarwal et al. | |
| 4,811,199 | 3/1989 | Kuechler et al. | 395/600 |
| 4,811,217 | 3/1989 | Tokizane et al. | 395/800 |
| 4,817,036 | 3/1989 | Millett et al. | 395/600 |
| 4,945,475 | 7/1990 | Bruffey et al. | 395/600 |
| 5,010,478 | 4/1991 | Deran | 395/600 |
| 5,121,493 | 6/1992 | Ferguson | 395/600 |
| 5,237,678 | 8/1993 | Kuechler et al. | 395/600 |
| 5,257,365 | 10/1993 | Powers et al. | 395/600 |
| 5,274,805 | 12/1993 | Ferguson et al. | 395/600 |
| 5,283,894 | 2/1994 | Deran | 395/600 |

OTHER PUBLICATIONS

"Finding Rules In Data", by Beverly Thompson and William, BYTE Magazine, Nov. 1986, pp. 149–152, 154, 156.

"A Bit–Mapped Classifier", by Peter W. Frey, Byte Magazine, Nov. 1986, pp. 161–163, 165–166, 168, 170, 172.

"Predicting International Events", by Philip A. Schrodt, BYTE Magazine, Nov. 1986, pp. 177–178, 181–182, 184, 186, 188, 190, 192.

"Retrieval On Secondary Keys", pp. 550–567, The Art of Computer Programming, vol. 3, Sorting and Searcing, by Knuth (1973).

Frisch, Joseph, "Bit Vectors Vitalize Data Retrieval," *Data Processing Magazine's Data Dynamics*, vol. 13, No. 8, pp. 37–41, Sep. 1971.

Jakobsson, M., "Implementation of Compressed Bit–Vector Indexes," *Department of Computer Science, University of Turku, IFIP* 79, pp. 581–586, 1979.

H. Ikeda et al., Database Design Using Compact Optical Disc As Read–Only Memory Devices, *IEEE Proceedings Of Tencon*, vol. 1, pp. 162–166, 1987.

Dialog Record 03949365, File 120 (Copyrights), ADABAS The adaptable database System, created in 1972, first published 1978, Jul. 1995.

Dialog Record 07065605 File 120 (Copyrights), Inside ADABAS, first published Aug. 1990, Jul. 1995.

"Rushmore's Bald Spot", DBMS, vol. 4, No. 10, Sep., 1991, p. 58, Sep. 1991.

Jeff Winchell, "dBASE IV 2.0 Query Innovations: Borland's latest dBASE release: On the forefront of bitmapped index optimization", DBMS, vol. 6, No. 10, Sep., 1993, pp. 68–71.

Douglas Comer, "The Ubiquitous B–Tree", Computing Surveys, vol. 11, No. 2, Jun. 1979, pp. 121–136.

Ron Ashany, "Application of Sparse Matrix Techniques to Search, Retrieval, Classification and Relationship Analysis in Large Data Base Systems –SPARCOM", *Fourth International Conference on Very Large Data Bases*, West Berlin, Germany, Sep. 13–15, 1978, pp. 499–516.

Dave Browning, "Database Design Techniques", *PC Tech Journal*, vol. 5, No. 7, Jul. 1987, pp. 112–123.

"Rushmore's Bald Spot", *DBMS*, vol. 4, No. 10, Sep. 1991, p. 58.

Jeff Wincell, "dBASE iv 2.0 Query Innovations: Borland's Latest dBASE Release: on the Forefront of Bitmap Index Optimization", *DBMS*, vol. 6, No. 10, Sep. 1993, pp. 68–72.

Anglin, M.D. et al., "Information Retrieval Technique," *IBM Technical Disclosure Bulletin*, vol. 16, No. 7, pp. 2223–2224 (Dec. 1973).

SYSTEM AND METHOD FOR IDENTIFYING DATA RECORDS USING SOLUTION BITMASKS

CROSS-REFERENCE TO RELATED APPLICATION

This application is a continuation of U.S. patent application Ser. No. 08/032,729, filed Mar. 16, 1993, now abandoned which was a continuation of U.S. patent application Ser. No. 07/593/089, filed Oct. 5, 1990, now abandoned.

TECHNICAL FIELD

The present invention relates to a data processing system and, in particular, a system and method for retrieving stored data in response to a specific search query.

BACKGROUND ART

Existing computer information databases provide a system for storing, manipulating and retrieving information quickly and accurately. Both home and business use of databases have increased with the proliferation of personal computers.

It is often desirable to retrieve information from a database which satisfies one or more selected criteria. However, the search for this information can be time-consuming, particularly when the database includes thousands of records which must be accessed from memory and examined before the selected information is retrieved.

Moreover, a particular search query may include a plurality of criteria which must be satisfied. In existing database systems, the entire data record must be accessed and read to determine whether that record satisfies each of the criteria in the search query.

Although a computer can access and evaluate stored information at an extremely rapid rate, multiple passes through irrelevant information stored in the data file of a database noticeably slows the processing time for a search query, particularly where the data file has many thousands of data records or where each record includes many fields of information.

Existing systems currently utilize index files (also referred to as inverted lists) which contain data derived from one or more fields of a record according to a pre-defined rule (a "key expression"), and some indicia (such as the record number) of the corresponding data record. The index files are often organized in a B-tree format or other ordering data structure to minimize search time.

The index file is ordered by the value of the key expression (the "key value"). For example, an index file might have as a key expression the name of the subject of a data record, with the index records ordered alphabetically. These index files are useful for finding a data record having a specific key value.

Also, where a search query includes a criteria relating to an indexed field, and the manner of data records satisfying that criteria are expected to limit the range of records satisfying the remaining criteria in the search query, a single index file may be utilized to direct the search in the data file to only those records for which the key value satisfies the search criteria. However, the limited range of data records must be read in their entirety to determine whether each of the remaining criteria (indexed or not) are satisfied.

Thus, for a particular search, the use of an index file provides access to a subset of the data files, ordered by the indexed key value, rather than the random access of all the data records in the data file. However, where a search query includes criteria involving key expressions from different index files, only one index file may be utilized in an attempt to limit the field of search of the data records, which data records must then be read in their entirety to complete the search.

DISCLOSURE OF INVENTION

It is an object of the present invention to provide a system for information retrieval wherein the system may determine if a particular data record includes information satisfying a particular search criteria without accessing the data file.

It is another object of the present invention to provide an information retrieval system wherein in response to a search query including two or more search criteria joined by a Boolean operator (e.g. AND, OR, NOT), a subset of data records satisfying one search criteria of a search query may be combined with another subset of data records satisfying another search criteria of that search query without access, storage or retrieval of the data records during the search process.

It is yet another object of the present invention to provide an information retrieval system wherein existing index files, such as B-tree indexes, may be utilized in the evaluation of a search query to greatly limit or eliminate the need for retrieving and reading data records from the data file.

The system of the present invention employs a CPU implementable method for retrieving data from a database system in response to a programmed search query. The system of the present invention is incorporated in a database system including an input device, a storage device, an output device, a data file stored in the storage device, the data file including a plurality of n data records, wherein each data record contains data stored in a plurality of fields, and where said storage device further includes at least one index file including a plurality of index records having data corresponding to a key expression comprising information derived from one or more of the fields of a data record, and indicia (such as the record number) of the data record containing the data from which the key value is extracted.

The system also includes logic for retrieving a subset of data records from the database satisfying a search criteria based upon information contained in an index file. The system includes logic for creating a temporary solution bitmask n bits in length wherein n corresponds to the number of records in the data file, logic for accessing an index file which includes a key expression relevant to the search criteria, for each key value which satisfies the search criteria, ascertaining the corresponding data file record number and setting the bit in the temporary solution bitmask corresponding to that record number, and logic for retrieving each data record in the data file for which the corresponding bit in the temporary solution bitmask has been set.

The system of the present invention also preferably includes logic for retrieving data satisfying a search query which includes several search criteria joined by a Boolean operator, wherein the system creates a temporary solution bitmask representing the set of data records satisfying each search criteria, and logic for combining the temporary solution bitmasks to form a final solution bitmask representing the set of all data files satisfying the search query.

The system of the present invention also preferably includes logic for analyzing a search query by breaking the query into its component criteria to determine whether a particular search query is optimizable using the system of the present invention. For example, if a particular criteria in the search query relates to information which is not a key expression in an index file (i.e. is not "indexed"), the system includes logic for determining whether analysis of the other criteria (those relating to information which is indexed) will limit the ultimate search through the data file necessary to analyze the information which is not indexed.

The system of the present invention may be employed in a database system including a conventional B-tree index file structure. The system is particularly efficient where the database has a relatively larger number of data records, and where index files have been created for often-searched data fields.

Thus, the system of the present invention gains a distinctive advantage in speed and efficiency over conventional data search and retrieval systems by searching the more compact index files wherever possible to determine which data records satisfy specific search criteria.

Moreover, where a search query includes multiple search criteria each relating to information contained in index files, the solution set of data records is ascertained by the system without time-consuming access to the data records. Instead, the solution bitmasks corresponding to each of the search criteria in the query are combined by a simple mathematical CPU operation (e.g., AND, OR, NOT) to yield a final solution bitmask identifying the records representing the solution to the query. The records in the data file are then retrieved once, passing through the data file in one direction only, and only for those records for which the corresponding bit in the final solution bitmask is set.

Even where a search query includes search criteria relating to information which is not contained in index files, the system of the present invention can often be utilized to greatly reduce the number of data records which must be accessed and read in the performance of the search.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
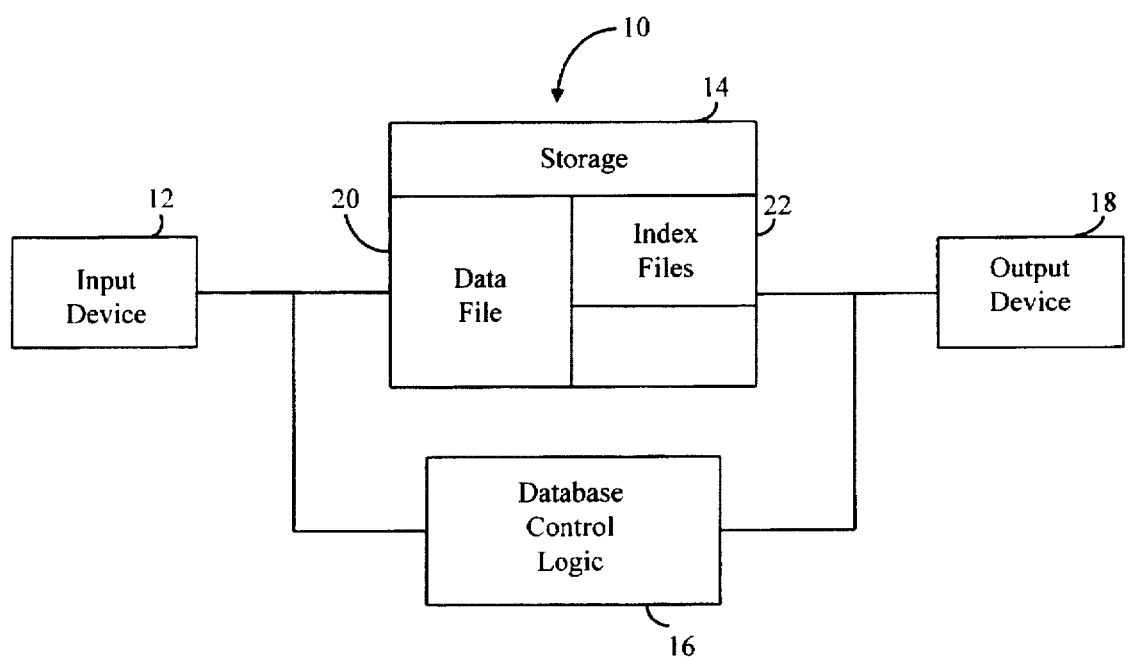
FIG. 1 is a block diagram of the information retrieval system of the present invention.

Referring now to FIG. 1, the information retrieval system of the present invention, generally referred to as 10, is incorporated in a database system including a data input device 12, data storage device 14, database control logic 16 for facilitating the input, storage and retrieval of data in the database, and an output device 18 for displaying or printing data. The data storage device 14 includes a data file 20 having n data records, where n is a positive integer greater than zero, and wherein each data record contains data stored in a plurality of predefined fields. Index files 22 are also stored in the storage device 14. The index files 22 include n index records, each having data corresponding to a key expression comprising information derived from one or more of the fields of a data record, and the record number of the data record containing the data from which the key value is extracted.

The database control logic 16 is capable of retrieving a subset of data records from the database satisfying a search criteria based upon information contained in an index file. The system 10 includes logic for creating a temporary solution bitmask n bits in length, where n corresponds to the number of records in the data file (and the number of records in each index file), logic for accessing an index file which includes a key expression relevant to the search criteria, and, for each key expression which satisfies the search criteria, ascertaining the corresponding data file record number and setting the bit in the solution bitmask corresponding to that record number. The database control logic 16 also includes logic for then retrieving each data record in the data file for which the corresponding bit in the temporary solution bitmask has been set.

A conventional personal computer, such as an IBM PC® or compatible, Apple Macintosh®, or any Unix®, Xenix®, or similar system may be utilized in the system of the present invention, providing the data input device 12 in the form of a conventional keyboard or mouse, the data storage device 14 in the form of any commercially available data storage options (such as 5¼ inch floppy disk drives, 3½ inch drives, various sized fixed disk drives or laser disk storage systems), and a conventional CRT display and/or compatible printer serving as the output device 18. The database control logic 16 may be a computer program written in any language suitable for systems programming.

The system 10 is preferably implemented on an IBM PC or compatible system having an 80386 or 80486 processor, a math co-processor, at least one megabyte of RAM, and a fixed disk having at least 20 megabytes of available memory. The database control logic is preferably programmed in the C language.

Figure 2:
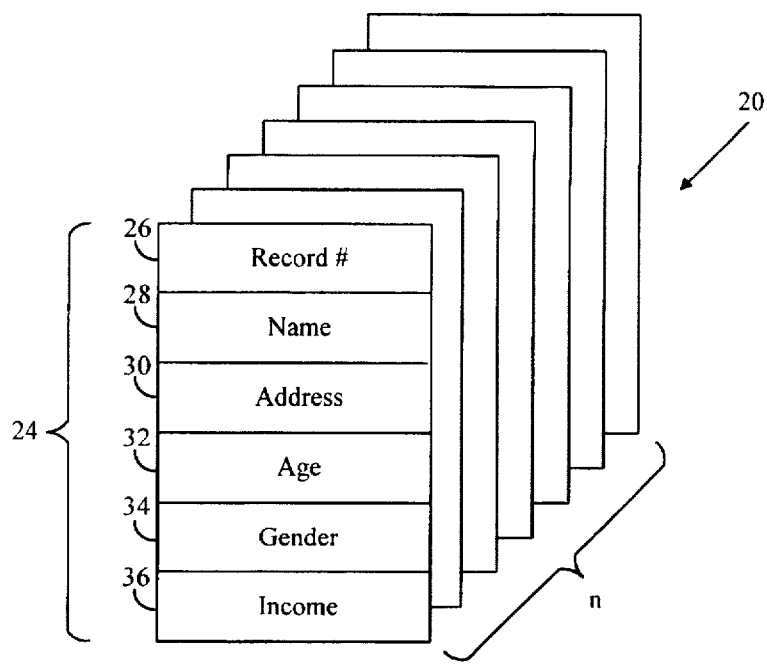
FIG. 2 is a diagram representing the data records of the data file in the database.

Referring now to FIG. 2, the data file 20 of the present invention includes a plurality (n) of data records 24. Each data record 24 is assigned a unique record number 26 when it is created. The data records 24 have record numbers 26 spanning a consecutive integer range, preferably 1–n. Each data record 24 contains data organized into a plurality of predefined fields 28–36. The data fields 28–36 comprise a set of predefined categories including ASCII representations of any alpha or numeric information which might be stored in that field. For example, FIG. 2 identifies field 28 as a "NAME" field which might include a customer or potential customer's name, field 30 as an "ADDRESS" field for that person's address, field 32 as an "AGE" field, field 34 as a "GENDER" field, and field 36 as an "INCOME" field. It will be appreciated by those skilled in the art that limitless kinds of data organized into a variety of fields may be desirable and are contemplated in the database system 10 of the present invention.

In the preferred embodiment, the data file 20 includes a header record and data records. The header record (shown below) defines the structure of the data file in the database and contains other information relating to the database.

| Database Header Record | |
|---|---|
| Bytes | Description |
| 00 | Type of database:<br>FoxBASE+/dBASE III PLUS, no memo - 0x03<br>FoxBASE+/dBASE III PLUS, with memo - 0x83<br>FoxPro/dBASE IV, no memo - 0x03<br>FoxPro, with memo - 0XF5<br>dBASE IV with memo - 0x8B |
| 01-03 | Last update (YYMMDD) |
| 04-07 | Number of records in file |
| 08-09 | Position of first data record |
| 10-11 | Length of one data record (including delete flag) |
| 12-31 | Reserved |
| 32-n | Field subrecords |
| n + 1 | Header record terminator (0x0D) |

Numbers in this file are represented in reverse bytes.

The field subrecords identified in the above table as occupying bytes 32-n are preferably organized in the following format:

| Field Subrecords | |
|---|---|
| 00-10 | Field name (maximum of 10 characters - if less than 10 it is padded with null character (0x00)) |
| 11 | Data Type:<br>C - Character<br>N - Numeric<br>L - Logical<br>M - Memo<br>D - Date |
| 12-15 | Displacement of field in record |
| 16 | Length of field (in bytes) |
| 17 | Number of decimal places |
| 18-32 | Reserved |

There is one field subrecord for each field 28–36 in the data records 24.

While the above tables depict the preferred database file structure, it will be appreciated by those skilled in the art that the information retrieval system of the present invention may be utilized with any conventional computer database file structure which includes a plurality of data records and at least one index file including key values derived from the fields of the data files organized into a like number of records, where the key values are in a predetermined order and each index record includes a reference to the data record number from which the key value is derived.

Figure 3:
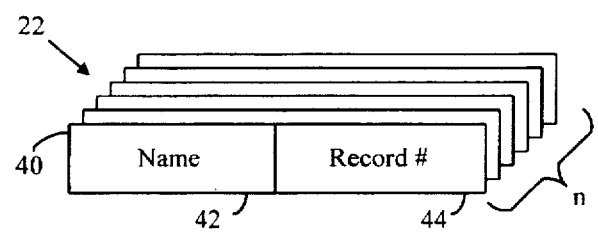
FIG. 3 is a diagram representing the index records of an index file in the database.
Figure 4:
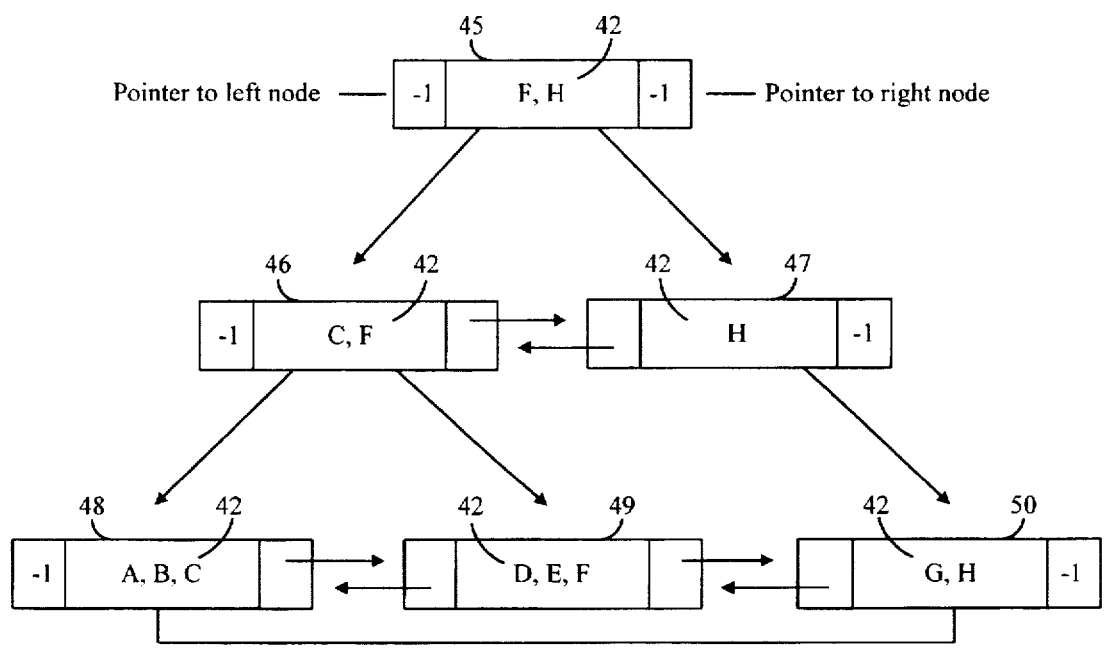
FIG. 4 is diagram illustrating a conventional B-tree index file structure which may be employed in the system of the present invention.

Referring now to FIG. 3, the index files 22 include n index records 40, each index record to include data in the form of a key value 42 and the record number 44 of the data record 24 from which the key value is derived. The index records are ordered in a predetermined manner on the basis of the key value 42, thus creating an inverted list of the data records 24 in the data file 20. The index records 40 in each index file 22 are preferably organized in an ordered tree structure, such as a conventional B-tree structure. The general structure of the index file 22 is illustrated in FIG. 4. It will be appreciated by those skilled in the art that, in this conventional B-tree arrangement, finding a key value 42 requires searching a single path from the root node 45 through one or more index nodes 46,47 to the leaf nodes 48, 49 and 50. Because the key values 42 are sorted, all key values 42 in the subtrees are less than or equal to the parent node to that subtree. It should be noted that the root node 45 and index nodes 46,47 contain key values 42 for the highest order data records for each of the nodes which depend from that root node 45 or index node 46. For example, in FIG. 4 the index node on the far left contains key values 42 having values C and F, since C is the highest key value in one leaf node depending from that index node, and F is the highest key value of the records in the other leaf node 49 depending from that index node.

In FIG. 4, letters are used as the key values 42. A four byte hexadecimal number would also be included with each key value 42. The number associated with the key values 42 in the leaf nodes 48–50 would be the actual data record numbers 26. The four byte hexadecimal number associated with each key value 42 in a root node 45 or an index node 46,47 would be an intra-index pointer. The record number is also included with each key value 42 in the index nodes 46,47 in the preferred embodiment.

In one embodiment, the index file 22 structure would include one header record and one or many node records. The header record contains information about the location of the root node 45, the list of free (unused) nodes in the index, the current file size, the maximum length of the key value 42, index options and signature, and printable ASCII representations of the key expression and FOR expression (preprogrammed expressions which limit the records to be included in the index). It should be noted that the index options, index signature and the FOR expression are not germane to the retrieval system of the present invention. The header records starts at file position zero and is preferably organized as set forth below:

| Offset | Title | Description |
|---|---|---|
| 0 | root | root node |
| 4 | free | free node list |
| 8 | end | current file size |
| 12 | klen | key length |
| 14 | opt | index options |
| 15 | sign | index signature |
| 16 | kexp | Key expression |
| 236 | forexp | For expression |
| 456 | filler [56] | Unused filler |

The node records contain a node attribute value number of key values 42 present in that node, and pointers to nodes on the left and right (on the same level) of the current node. The node records also contain a group of characters containing the key value 42 and either a pointer to a lower level node or (in the case where the node is a leaf node 48) the record number 26. The size of each record is preferably 512 bytes.

The index node records (that is the records for each of the entries in the root node 45, the index nodes 46,47 and the leaf nodes 48–50) may be structured as follows:

| Offset | Title | Description |
|---|---|---|
| 0 | att | Node attribute |
| 2 | keys | Number of keys in node |
| 4 | left | Left sibling node (−1 = none) |
| 8 | right | Right sibling node (−1 = none) |
| 12 | ixn | index keys and key information<br>Where each entry is:<br>[key_text]<br>[4 byte intra file offset] |

Bytes 12–511 in the index node records could be viewed as follows:

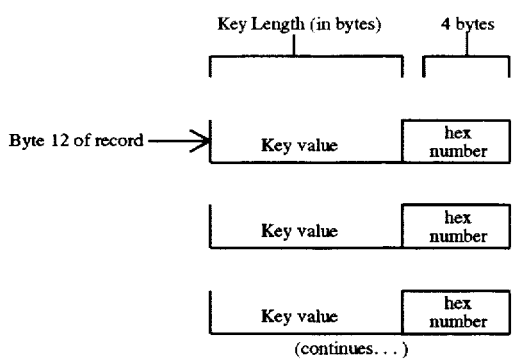

In another preferred embodiment of the system of the present invention, the index file structure may be altered to a more compact format where the key values in each leaf node 48–50 are stored in a compressed format to eliminate duplicative information and trailing spaces from the key values. The index header records for the compact format is preferably organized as set forth below:

| Offset | Title | Description |
| --- | --- | --- |
| 0 | root | root node |
| 4 | free | free node list |
| 8 | end | current file size |
| 12 | klen | key length |
| 14 | opt | index options |
| 15 | sign | index signature |
| 16 | tkeys | Number of total keys |
| 20 | ukeys | Number of unique keys |
| 24 | dispersion | Dispersion |
| 28 | inversions | Number of inversions |
| 32 | negskips | Number of negative skips |
| 36 | filler [466] | Filler - Futre expansion. |
| 502 | descending: Bit 0 | index is in descending order |
| 504 | fexpoff | Forexp pool offset |
| 506 | fexplen | Forexp pool length |
| 508 | kexpoff | Keyexp pool offset |
| 510 | kexplen | Keyexp pool length |
| 512 | pool [512] | (uncompiled) key exp pool |

As seen in the above table, the compact index header contains a pointer to the root node, the list of free nodes in the index, the current file size, the maximum length of the key value, index options and signature, the total number of key values in the index, and the total number of those values which are unique. The next three entries, a dispersion value (representing the degree of variance of the physical order of the key values in the index from their value order), the number of inversions (number of times the search will change directions to find the next ordered key value in storage), the number of negative skips (number of times the search will move in reverse of the normal order of storage) are statistical values not germane in the system of the present invention. The remaining entries include a flag indicating whether the index is in descending order, offset values and length values for the FOR expression and the key expression, and the uncompiled FOR and key expressions.

The interior (non-leaf) nodes in the compact format are organized as set forth below:

| Offset | Title | Description |
| --- | --- | --- |
| 0 | att | Node attribute |
| 2 | keys | Number of keys in node |
| 4 | left | Left sibling node (−1 = none) |
| 8 | right | Right sibling node (−1 = node) |
| 12 | ixn | Index keys and key information Where each entry is: \|4 key_text\| \|4 byte record number\| \|4 byte intra file offset\| |

The interior nodes format is identical to the non-compact interior nodes except that each key value contained in an interior node includes a four byte record number in addition to the four byte intra-file offset.

The leaf nodes 48–50 have the following modified arrangement:

| Offset | Title | Description |
| --- | --- | --- |
| 0 | att | Node attribute |
| 2 | keys | Number of keys in node |
| 4 | left | Left sibling node (−1 = none) |
| 8 | right | Right sibling node (−1 = none) |
| 12 | avail | Available free space in node |
| 14 | rmask | Record number mask |
| 18 | dmask | Duplicate byte count mask |
| 19 | tmask | Trailing byte count mask |
| 20 | rbits | # of bits used for record number |
| 21 | ebits | # of bits used for dup count |
| 22 | tbits | # of bits used for trail count |
| 23 | mien | # of bytes holding r#, dent, tent |
| 12 | ixn [488] | Index keys and key information Where each entry consists of [record_number] [dup byte count] [trail byte count] compacted into mien bytes. The key text is placed at the logical end of the node, working backwards, allowing for previous key entries |

In addition to the node attribute, number of keys in the node, and pointers to the left and right siblings, the compact leaf node format includes (at byte offset 12) an indication of the amount of free space in that node, and record number, duplicate byte and trailing byte masks. Each of these masks, when combined with the key information for a particular key value, yields the record number, the number of bytes that key has which are contained in the previous key value in the list, and the number of trailing bytes (such as spaces) which have been eliminated because the particular key value is smaller than the maximum key value length.

Beginning at byte offset 20, the compact index leaf node format contains the values for the number of bytes used in the node to store the record number, duplicate count, and trailing count values, and the number of bytes required to hold the key information (record number, duplicate count, trailing count) for each key value in the node.

Figure 5:
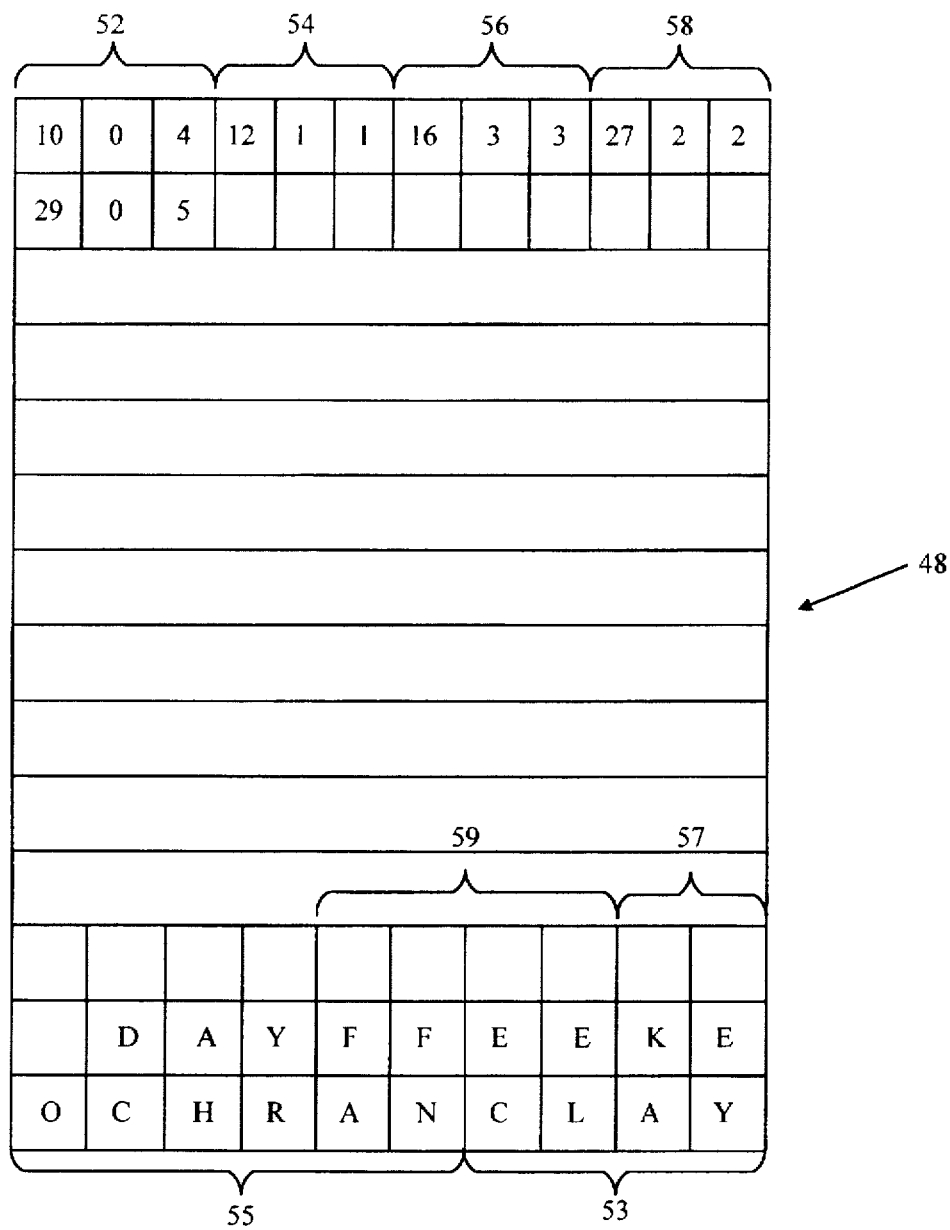
FIG. 5 is a diagram of an alternate index file structure for the leaf nodes of the index file which may be utilized in the retrieval system of the present invention.

Referring now to FIG. 5, the alternative compact leaf node index file structure contains a plurality of bytes containing key information 52, 54, 56 and 58 for each of the records in the node and compressed format key values 53, 55, 57 and 59 for each key in the node. The key information includes the record number, a duplicate count and a trailing count for each key in the node. From this information, the system can construct the key value for that key. For example, the first record listed in FIG. 5 is record 10. Since this is the first record and key value entered in this node, the duplicate count is zero. Finally, assuming, for this example, that the maximum length of the key value is eight characters, the trailing count is four. On the basis of this information, the system can retrieve the key value by starting at the end of the node and retrieving the last four characters (8–4)—yielding the information that "Clay" is the key expression for record 10. The second key in this node is record number 12. The key information for record 12 indicates a duplicate count of one and a trailing count of one. The key value for this record is then ascertained by retrieving the number of characters equal to the duplicate count from the previous key value (in this case "C") and the next previous six characters (the maximum length less (the duplicate count plus the trailing count)) yielding a key value of "Cochran" for record number 12. In a like manner, the key information and the compressed format key values in the leaf node 48 can be analyzed to extract the following key values for the following records:

"Cocke", Record #16.

"Coffee", Record #27.

"Day", Record #29.

This alternative leaf node structure is preferable because it eliminates wasted space caused by: (a) trailing characters for each key expression which is less than the maximum key value size, and (b) repeated characters where, for example, the key expression is an alpha expression ordered alphabetically.

It will appreciated by those skilled in the art that the system of the present invention may be utilized with any file structure which utilizes index files, and is particularly efficient where those index files are structured to occupy as small a space as possible in the disk (or other storage device) while providing for rapid extraction of key expressions and record numbers from the index.

Figure 6:
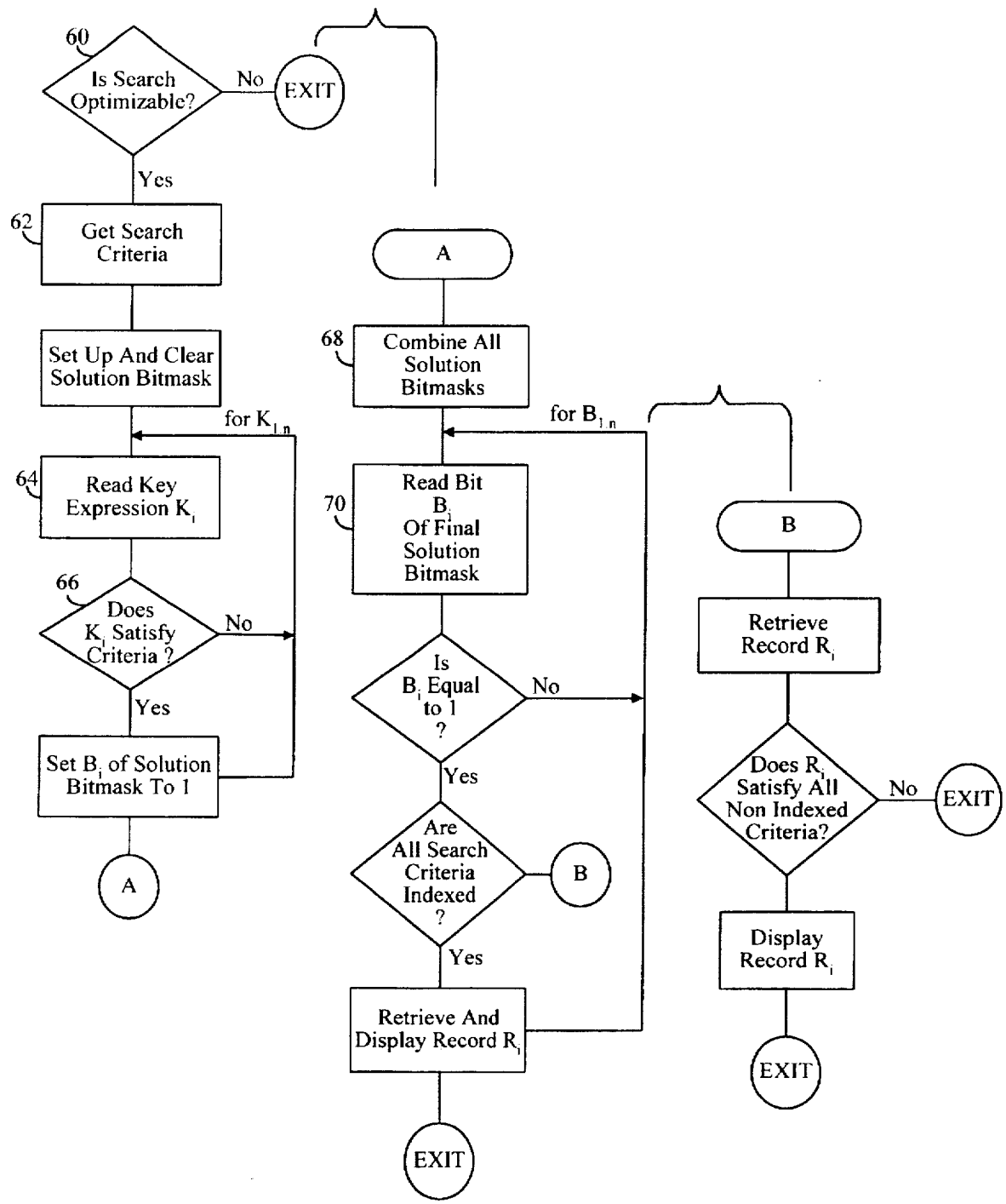
FIG. 6 is a flow chart of information retrieval system of the present invention.

The control logic of the present invention is outlined in the flow chart of FIG. 6, and will be described below.

Once the system has received a search query, the system determines whether or not the search is optimizable using the system of the present invention (at 60). The query is broken down into its atomic components. These components include, for example, a key expression limited by a constant or a defined variable.

An atomic component of a query, also referred to herein as a search criteria, could be any of the following examples:

NAME="CLAY"  (1)

$25 \leq AGE \leq 35$  (2)

$INCOME \geq 50,000$  (3)

A search query may be comprised of a single search criteria, or may include a number of criteria joined by a Boolean operator, such as AND, OR, or NOT. The following are examples of search queries which include multiple search criteria:

$25 \leq AGE \leq 35$ AND $INCOME \geq 50,000$  (4)

NAME="CLAY" AND ($25 \leq AGE \leq 35$ OR $INCOME \geq 50,000$)  (5)

Figure 7:
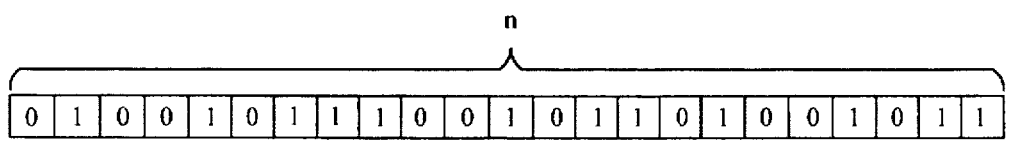
FIG. 7 is a diagram of the solution bitmask employed by the system of the present invention.

Using query (1) as an example, the system would determine whether or not the key expression NAME is indexed. If it is indexed, the search criteria is then retrieved. A temporary solution bitmask, of the type shown in FIG. 7, having n bits, is set up with each bit having a value zero. The key values in the index records are then retrieved to determine whether the key value satisfies the search criteria (at 64 and 66). If the search criteria is satisfied by a particular key value, the corresponding record number is ascertained and the corresponding bit in the temporary solution bitmask is set. Thus, for example, if a particular key value is "Clay", then the record number corresponding to that key value is ascertained. From FIG. 5, the record information 52 for key value "Clay" 55 indicates that that key value is from record number 10. The system then sets bit 10 in the temporary solution bitmask.

If, as in the present example, the search query contained a single search criteria, the system would then read each bit of the temporary solution bitmask 70 and, for each bit equal to one, the system would retrieve the data record having the record number corresponding to the position of that bit. By retrieving data records having record numbers equal to the bit positions of all bits in the solution bitmask set equal to one, the solution set for that search query is obtained.

Using query (4) as an example, the system would determine (at 60) if each of the atomic components of the query is optimizable. There are two atomic components in example (4)—expression (2) and expression (3).

If each of the search criteria (i.e. expression (2) and expression (3)) is indexed, the system would proceed to 62 and develop temporary solution bitmasks for each of the two criteria. The two temporary solution bitmasks would then be combined (at 68). In the case of query (4), the processor would perform a logical AND on the temporary solution bitmask representing the solution to criteria (2) and the temporary solution bitmask representing the solution to criteria (3) yielding a final solution bitmask representative of the set of records satisfying both criteria. The system would then proceed (at 70) to retrieve the records by reference to each of the bits in the final solution bitmask.

Referring again to query (4), if one of the criteria is indexed and one is not (i.e. the information for that criteria can be found only in the data file), the system must then determine whether utilization of the system of the present invention to retrieve records satisfying the indexed criteria is worthwhile. If, for example, AGE was indexed but INCOME was not, it would still be efficient to utilize the system of the present invention to develop a temporary solution bitmask for the criteria relating to AGE, since that criteria is being ANDed with the INCOME criteria, thereby limiting the range of records which must be accessed in the data file for analysis of the INCOME criteria. Thus, for example, analysis of the AGE criteria in query (4) would yield a temporary solution bitmask identifying those records which satisfy the AGE criteria. Since the solution to this query is a subset of this set of records, the system may then read only those records in the data file having the record numbers corresponding to bits in the bitmask which are equal to one, thereby reducing the number of data records which must be analyzed.

It should be noted that, if query (4) were altered by substituting the Boolean operator OR for AND, then the system of the present invention would not be useful in solving the query if one of the criteria (for example, AGE) were not indexed. That is because analysis of the indexed criteria would not limit the range of possible solutions to the other criteria. In this case, since all of the data records in the data file must be accessed to resolve the INCOME criteria, the system would exit (at 72).

It should be noted that the nesting of the atomic components of the query is significant in the determination of whether a particular query is optimizable. Using query (5) as an example, assuming NAME and AGE are indexed key expressions and INCOME is not, this query will still be optimizable utilizing the system of the present invention. Although the parenthetical component which ORs the ORs the AGE criteria and the INCOME criteria would not be optimizable, the system of the present invention should be utilized to develop a temporary solution bitmask for the NAME criteria, since the NAME criteria is ANDed with the combination of the AGE and INCOME criteria.

It will be appreciated by those skilled in the art that the advantages of the present invention may be enhanced by employing other search limiting techniques. For example, analysis of the quantity of records inside or outside a specified range may yield a threshold determination that the search time for a particular criteria may be greatly reduced if a search is conducted for those records which do not satisfy the search criteria. Using criteria (3) as an example, a threshold examination of the INCOME index may indicate that all but a relatively small number of records are likely to satisfy the criteria that INCOME is ≧ to 50,000. A search can then be conducted of the index file to ascertain INCOME less than 50,000, create the temporary solution bitmask, and then invert the values of the bitmask.

While the best mode for carrying out the invention has been described in detail, those familiar with the art to which this invention relates will recognize various alternative designs and embodiments for practicing the invention as defined by the following claims.

What is claimed is:

1. A method in a computer system for identifying a subset of a plurality of data records that satisfy a search criterion, each of the plurality of data records having a record identifier and containing data organized into one or more fields, the search criterion relating to a selected one of the fields, the method comprising the steps of:

receiving a search query specifying the search criterion;

before receiving the search query, providing an index identifying the contents of the selected field of at least a portion of the data records, the index containing, for each data record, a data record identifier usable to access the data record and an indication of the contents of the selected field, the data record identifiers in the index being separated by a uniform offset; and after receiving the search query, using the index to select the data record identifiers of the data records that satisfy the search criterion without accessing the data records.

2. The method of claim 1, further including the step of reading two or more data record identifiers from the index beginning from the location of an initial data record identifier in the index by, for each such data record identifier:

incrementing the location by the uniform offset between data record identifiers; and reading the data record identifier at the incremented location.

3. The method of claim 1, further comprising the steps of:

creating a mask identifying the data records having the selected data record identifiers, the mask comprised of distinct entries and containing exactly one entry corresponding to each of the plurality of data records, each entry being initialized to a first value; and for each selected index record, setting the entry in the mask that corresponds to the data record identified by the record identifier to a second value, whereby each entry in the mask set to the second value identifies one of the subset of the plurality of stored data records that satisfies the search criterion, and whereby each entry of the mask set to the first value identifies one of the subset of the plurality of stored data records that does not satisfy the search criterion.

4. The method of claim 2, further comprising the step of determining that each data record whose data record identifier appears in the index satisfies the search criterion, and wherein the step of reading two or more data record identifiers from the index includes the step of reading every data record identifier from the index, and wherein the selecting step includes the step of selecting the data records having the data records identifiers read from the index.

5. The method of claim 2 wherein the data record identifiers are ordered in the index in accordance with an ordering of the contents of the selected field of each row, and wherein the step of reading two or more data record identifiers from the index is performed in response to a request to scroll through the data records in accordance with the ordering of the contents of the selected field of each row.

6. The method of claim 2 wherein the received scrolling request specifies either a first scrolling direction or a second scrolling direction, and wherein, if the received scrolling request specifies a first scrolling direction, the incrementing step increments the location by a positive offset, and wherein, if the received scrolling request specifies a second scrolling direction, the incrementing step increments the location by a negative offset.

7. A method in a computer system for identifying a subset of a plurality of data records that satisfy a search criterion, each of the plurality of data records having a record identifier and containing data organized into one or more fields, the search criterion relating to a selected one of the fields, the method comprising the steps of:

receiving a search query specifying the search criterion;

before receiving the search query providing an index identifying the contents of the selected field of at least a portion of the data records, the index containing, for each data record, a data record identifier usable to access the data record and an indication of the contents of the selected field, the data record identifiers in the index being separated by a uniform offset;

after receiving the search query, using the index to select the data record identifiers of the data records that satisfy the search criterion;

creating a mask identifying the data records having the selected data record identifiers, the mask comprised of distinct entries and containing exactly one entry corresponding to each of the plurality of data records, each entry being initialized to a first value; and for each selected index record, setting the entry in the mask that corresponds to the data record identified by the record identifier to a second value, whereby each entry in the mask set to the second value identifies one of the subset of the plurality of stored data records that satisfies the search criterion, and whereby each entry of the mask set to the first value identifies one of the subset of the plurality of stored data records that does not satisfy the search criterion, and wherein the length of the data record identifiers is fixed across data records, and wherein the indications of the contents of the selected field contained in the index comprise compressed field contents and decompression information for decompressing the compressed field contents, the length of the compressed field contents being variable across data records and the length of the decompression information being fixed across data records, and wherein the fixed-length data record identifier and decompression information for each data record are stored contiguously in a first part of the index such that data record identifiers alternate with decompression information, and wherein the variable-length compressed field contents for each data record are stored in a second part of the index.

8. A computer-readable medium whose contents cause a computer system to identify a subset of a plurality of data records that satisfy a search criterion, each of the plurality of data records having a record identifier and containing data organized into one or more fields, the search criterion relating to a selected one of the fields, by performing the steps of:

receiving a search query specifying the search criterion;

before receiving the search query, providing an index identifying the contents of the selected field of at least a portion of the data records, the index containing, for each data record, a data record identifier usable to access the data record and an indication of the contents of the selected field, the data record identifiers in the index being separated by a uniform offset; and after receiving the search query, using the index to select the data record identifiers of the data records that satisfy the search criterion without accessing the data records.

9. The computer-readable medium of claim 8 wherein the contents of the computer-readable medium further cause the computer system to perform the steps of:

creating a mask identifying the data records having the selected data record identifiers, the mask comprised of distinct entries and containing exactly one entry corresponding to each of the plurality of data records, each entry being initialized to a first value; and for each selected index record, setting the entry in the mask that corresponds to the data record identified by the record identifier to a second value, whereby each entry in the mask set to the second value identifies one of the subset of the plurality of stored data records that satisfies the search criterion, and whereby each entry of the mask set to the first value identifies one of the subset of the plurality of stored data records that does not satisfy the search criterion.

10. The computer-readable medium of claim 8 wherein the contents of the computer-readable medium further cause the computer system to read two or more data record identifiers from the index beginning from the location of an initial data record identifier in the index by, for each such data record identifier:

incrementing the location by the uniform offset between data record identifiers; and reading the data record identifier at the incremented location.

11. A computer-readable medium whose contents cause a computer system to identify a subset of a plurality of data records that satisfy a search criterion, each of the plurality of data records having a record identifier and containing data organized into one or more fields, the search criterion relating to a selected one of the fields, by performing the steps of:

receiving a search query specifying the search criterion;

before receiving the search query providing an index identifying the contents of the selected field of at least a portion of the data records, the index containing, for each data record, a data record identifier usable to access the data record and an indication of the contents of the selected field, the data record identifiers in the index being separated by a uniform offset;

after receiving the search query, using the index to select the data record identifiers of the data records that satisfy the search criterion;

creating a mask identifying the data records having the selected data record identifiers, the mask comprised of distinct entries and containing exactly one entry corresponding to each of the plurality of data records each entry being initialized to a first value; and for each selected index record, setting the entry in the mask that corresponds to the data record identified by the record identifier to a second value, whereby each entry in the mask set to the second value identifies one of the subset of the plurality of stored data records that satisfies the search criterion, and whereby each entry of the mask set to the first value identifies one of the subset of the plurality of stored data records that does not satisfy the search criterion, and wherein the length of the data record identifiers is fixed across data records, and wherein the indications of the contents of the selected field contained in the index comprise compressed field contents and decompression information for decompressing the compressed field contents, the length of the compressed field contents being variable across data records and the length of the decompression information being fixed across data records, and wherein the fixed-length data record identifier and decompression information for each data record are stored contiguously in a first part of the index such that data record identifiers alternate with decompression information, and wherein the variable-length compressed field contents for each data record are stored in a second part of the index.

12. An apparatus for identifying a subset of a plurality of data records that satisfy a search criterion, each of the plurality of data records having a record identifier and containing data organized into one or more fields, the search criterion relating to a selected one of the fields, comprising:

a search query receiving subsystem that receives a search query specifying the search criterion;

an index provision subsystem that provides an index identifying the contents of the selected field of at least a portion of the data records before receiving the search query, the index containing, for each data record, a data record identifier usable to access the data record and an indication of the contents of the selected field, the data record identifiers in the index being separated by a uniform offset; and a record selection subsystem that uses the index to select the data record identifiers of the data records that satisfy the search criterion after receiving the search query without accessing the data records.

13. The apparatus of claim 12, further comprising a data record identifier reader that reads two or more data record identifiers from the index beginning from the location of an initial data record identifier in the index by, for each such data record identifier:

incrementing the location by the uniform offset between data record identifiers; and reading the data record identifier at the incremented location.

14. The apparatus of claim 12, further comprising:

a mask creation subsystem that creates a mask identifying the data records having the selected data record identifiers, the mask comprised of distinct entries and containing exactly one entry corresponding to each of the plurality of data records, each entry being initialized to a first value; and a mask setting subsystem that, for each selected index record, sets the entry in the mask that corresponds to the data record identified by the record identifier to a second value, whereby each entry in the mask set to the second value identifies one of the subset of the plurality of stored data records that satisfies the search criterion, and whereby each entry of the mask set to the first value identifies one of the subset of the plurality of stored data records that does not satisfy the search criterion.

15. An apparatus for identifying a subset of a plurality of data records that satisfy a search criterion, each of the plurality of data records having a record identifier and containing data organized into one or more fields, the search criterion relating to a selected one of the fields, comprising:

a search query receiving subsystem that receives a search query specifying the search criterion;

an index provision subsystem that provides an index identifying the contents of the selected field of at least a portion of the data records before receiving the search query, the index containing, for each data record, a data record identifier usable to access the data record and an indication of the contents of the selected field, the data record identifiers in the index being separated by a uniform offset;

a record selection subsystem that uses the index to select the data record identifiers of the data records that satisfy the search criterion after receiving the search query;

a mask creation subsystem that creates a mask identifying the data records having the selected data record identifiers, the mask comprised of distinct entries and containing exactly one entry corresponding to each of the plurality of data records, each entry being initialized to a first value; and a mask setting subsystem that, for each selected index record, sets the entry in the mask that corresponds to the data record identified by the record identifier to a second value, whereby each entry in the mask set to the second value identifies one of the subset of the plurality of stored data records that satisfies the search criterion, and whereby each entry of the mask set to the first value identifies one of the subset of the plurality of stored data records that does not satisfy the search criterion, and wherein the length of the data record identifiers is fixed across data records, and wherein the indications of the contents of the selected field contained in the index comprise compressed field contents and decompression information for decompressing the compressed field contents, the length of the compressed field contents being variable across data records and the length of the decompression information being fixed across data records, and wherein the fixed-length data record identifier and decompression information for each data record are stored contiguously in a first part of the index such that data record identifiers alternate with decompression information, and wherein the variable-length compressed field contents for each data record are stored in a second part of the index.

16. A method in a computer system for identifying a subset of a plurality of data records that satisfy a search criterion, each of the plurality of data records having a record number and containing data organized into one or more fields, the search criterion relating to a selected one of the fields, the method comprising the steps of:

receiving a search query specifying the search criterion;

before receiving the search query, providing an index identifying the contents of the selected field of at least a portion of the data records, the index containing, for each data record, a data record number usable to access the data record and an indication of the contents of the selected field, a data record number size value further being stored in conjunction with the index that indicates the amount of space occupied in the index by each data record number; and after receiving the search query, using the index to select the data record numbers of the data records that satisfy the search criterion.

17. The method of claim 16 wherein the selecting step includes the steps of:

reading the data record number size value; and using the data record number size value to select data record numbers of the size indicated by the read data record number size value.

18. The method of claim 16, further comprising the steps of:

creating a mask identifying the data records having the selected data record numbers, the mask comprised of distinct entries and containing exactly one entry corresponding to each of the plurality of data records, each entry being initialized to a first value; and for each selected index record, setting the entry in the mask that corresponds to the data record identified by the record number to a second value, whereby each entry in the mask set to the second value identifies one of the subset of the plurality of stored data records that satisfies the search criterion, and whereby each entry of the mask set to the first value identifies one of the subset of the plurality of stored data records that does not satisfy the search criterion.

19. A computer-readable medium whose contents cause a computer system to identify a subset of a plurality of data records that satisfy a search criterion, each of the plurality of data records having a record number and containing data organized into one or more fields, the search criterion relating to a selected one of the fields, by performing the steps of:

receiving a search query specifying the search criterion;

before receiving the search query, providing an index identifying the contents of the selected field of at least a portion of the data records, the index containing, for each data record, a data record number usable to access the data record and an indication of the contents of the selected field, a data record number size value further being stored in conjunction with the index that indicates the amount of space occupied in the index by each data record number; and after receiving the search query, using the index to select the data record numbers of the data records that satisfy the search criterion.

20. The computer-readable medium of claim 19 wherein the selecting step includes the steps of:

reading the data record number size value; and using the data record number size value to select data record numbers of the size indicated by the read data record number size value.

21. The computer-readable medium of claim 19 wherein the contents of the computer-readable medium further cause the computer system to perform the steps of:

creating a mask identifying the data records having the selected data record numbers, the mask comprised of distinct entries and containing exactly one entry corresponding to each of the plurality of data records, each entry being initialized to a first value; and for each selected index record, setting the entry in the mask that corresponds to the data record identified by the record number to a second value, whereby each entry in the mask set to the second value identifies one of the subset of the plurality of stored data records that satisfies the search criterion, and whereby each entry of the mask set to the first value identifies one of the subset of the plurality of stored data records that does not satisfy the search criterion.

22. An apparatus for identifying a subset of a plurality of data records that satisfy a search criterion, each of the plurality of data records having a record number and containing data organized into one or more fields, the search criterion relating to a selected one of the fields, comprising:

a search query receiving subsystem that receives a search query specifying the search criterion;

an index provision subsystem that provides an index identifying the contents of the selected field of at least a portion of the data records before receiving the search query, the index containing, for each data record, a data record number usable to access the data record and an indication of the contents of the selected field, a data record number size value further being stored in conjunction with the index that indicates the amount of space occupied in the index by each data record number; and a record selection subsystem that uses the index to select the data record numbers of the data records that satisfy the search criterion after receiving the search query.

23. The apparatus of claim 22 wherein the record selection subsystem further reads the data record number size value and uses the data record number size value to select data record numbers of the size indicated by the read data record number size value.

24. The apparatus of claim 22, further comprising:

a mask creation subsystem that creates a mask identifying the data records having the selected data record numbers, the mask comprised of distinct entries and containing exactly one entry corresponding to each of the plurality of data records, each entry being initialized to a first value; and a mask setting subsystem that, for each selected index record, sets the entry in the mask that corresponds to the data record identified by the record number to a second value, whereby each entry in the mask set to the second value identifies one of the subset of the plurality of stored data records that satisfies the search criterion, and whereby each entry of the mask set to the first value identifies one of the subset of the plurality of stored data records that does not satisfy the search criterion.

25. A method in a computer system for identifying a subset of a plurality of data records that satisfy a search criterion, each of the plurality of data records having a record identifier and containing data organized into one or more fields, the search criteria relating to a selected one of the fields, the method comprising the steps of:

receiving a search query specifying the search criterion;

before receiving the search query, providing an index identifying the contents of the selected field of at least a portion of the data records, the index containing, for each data record, a data record identifier usable to access the data record and an indication of the contents of the selected field comprising both compressed field contents for the field and decompression information for decompressing the compressed field contents, the beginning of the data record identifiers in the index being separated by a uniform offset, the beginning of the indications of the contents of the selected field being separated by a non-uniform offset; and after receiving the search query, using the index to select the data record identifiers of the data records that satisfy the search criterion without accessing the data records.

26. The method of claim 25 wherein the providing step provides an index in which each data record identifier is the same size.

27. A computer-readable medium whose contents cause a computer system to identify a subset of a plurality of data records that satisfy a search criterion, each of the plurality of data records having a record identifier and containing data organized into one or more fields, the search criteria relating to a selected one of the fields, by performing the steps of:

receiving a search query specifying the search criterion;

before receiving the search query, providing an index identifying the contents of the selected field of at least a portion of the data records, the index containing, for each data record, a data record identifier usable to access the data record and an indication of the contents of the selected field comprising both compressed field contents for the field and decompression information for decompressing the compressed field contents, the beginning of the data record identifiers in the index being separated by a uniform offset, the beginning of the indications of the contents of the selected field being separated by a non-uniform offset; and after receiving the search query, using the index to select the data record identifiers of the data records that satisfy the search criterion without accessing the data records.

28. The computer-readable medium of claim 27 wherein the providing step provides an index in which each data record identifier has the same size.

* * * * *